United States Patent [19]

Kawahara

[11] 4,451,956
[45] Jun. 5, 1984

[54] CLASPING DEVICE

[75] Inventor: Akira Kawahara, Kagawa, Japan

[73] Assignee: Ryusyo Industrial Co., Ltd., Osaka, Japan

[21] Appl. No.: 288,931

[22] Filed: Jul. 31, 1981

[30] Foreign Application Priority Data

Aug. 8, 1980 [JP] Japan .......................... 55-113022[U]
Oct. 27, 1980 [JP] Japan .......................... 55-153671[U]
Apr. 11, 1981 [JP] Japan ............................ 56-52175[U]

[51] Int. Cl.³ ............................................. B65D 68/08
[52] U.S. Cl. ............................. 24/68 CD; 24/69 ST; 24/71 R; 24/302
[58] Field of Search .................... 24/302, 68 R, 68 E, 24/69 R, 69 ST, 71 R, 71 ST, 71.1, 68 CD

[56] References Cited

U.S. PATENT DOCUMENTS

| 1,428,560 | 9/1922 | Robinson | 24/68 E |
| 3,252,188 | 5/1966 | Davis | 24/68 E |
| 3,703,024 | 11/1972 | Johnson | 24/71 R |
| 3,707,022 | 12/1972 | Diehl | 24/68 R |
| 4,049,301 | 9/1977 | Schenk | 24/68 R |
| 4,315,350 | 2/1982 | Looker et al. | 24/68 R |
| 4,377,886 | 3/1983 | Golden | 24/71.1 |

FOREIGN PATENT DOCUMENTS

| 685349 | 2/1967 | Belgium | 24/302 |
| 2419160 | 10/1975 | Fed. Rep. of Germany | 24/68 R |
| 2627368 | 2/1977 | Fed. Rep. of Germany | 24/68 R |
| 53-129694 | 10/1978 | Japan . | |
| 878051 | 9/1961 | United Kingdom | 24/68 E |
| 1255929 | 12/1971 | United Kingdom | 24/302 |

Primary Examiner—Victor N. Sakran
Attorney, Agent, or Firm—Wenderoth, Lind & Ponack

[57] ABSTRACT

A clasping device which has a body and a manipulatable lever pivotally connected to the body. The body has at least two connecting members extending between a pair of side plate members thereof, one of the connecting members can contact a strap connected to the lever means during the usual use to firmly hold the lever in a locked position. The other of the connecting members can contact the strap when the assembly of the body and the lever is turned upside down, to hold the lever in the locked position. A large part of the lever is housed in the pair of side plate members of the body substantially in parallel to the body in the locked position, whereby the construction of the assembly is easy to handle and so firm as to be resistant to any big loads.

14 Claims, 18 Drawing Figures

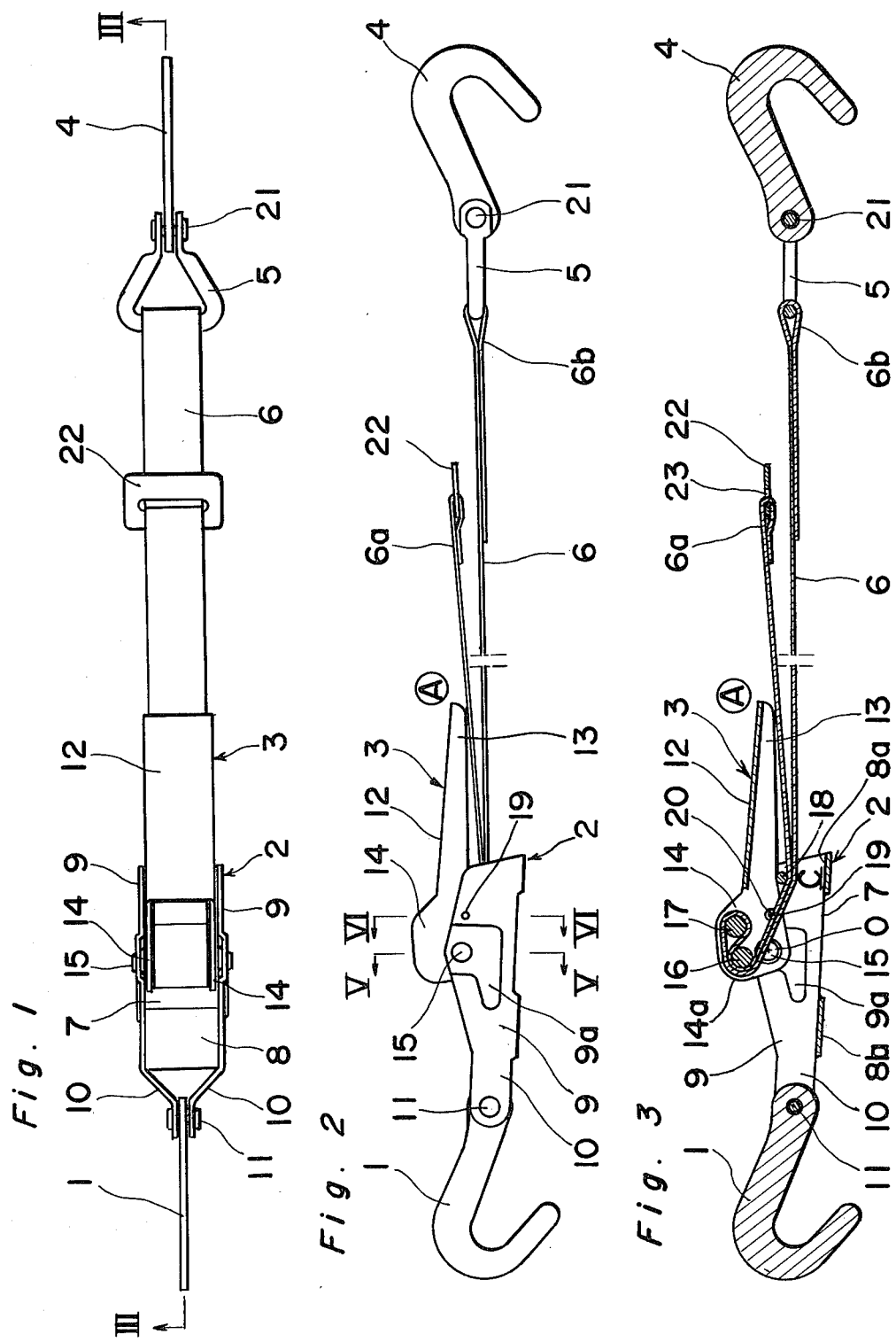

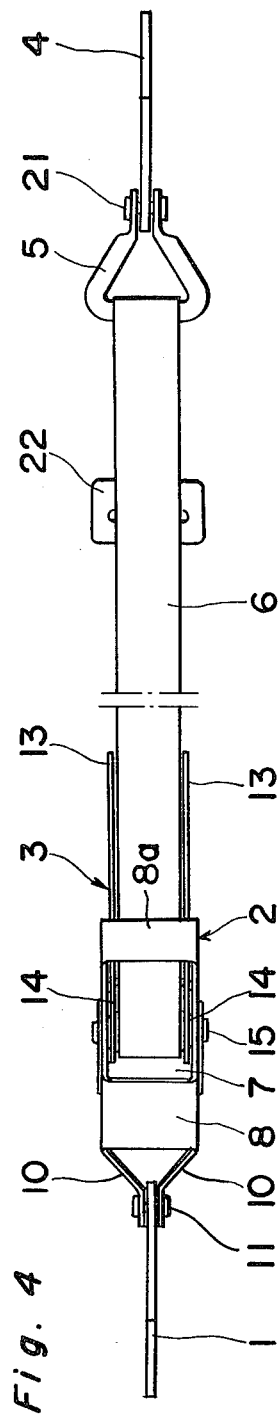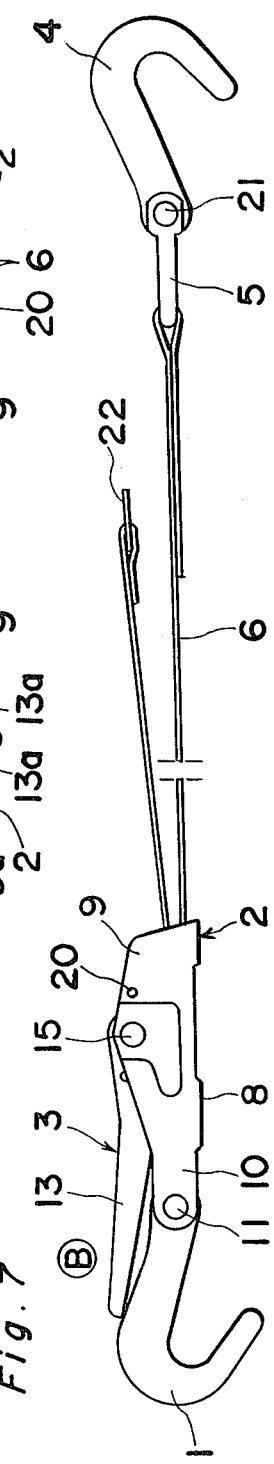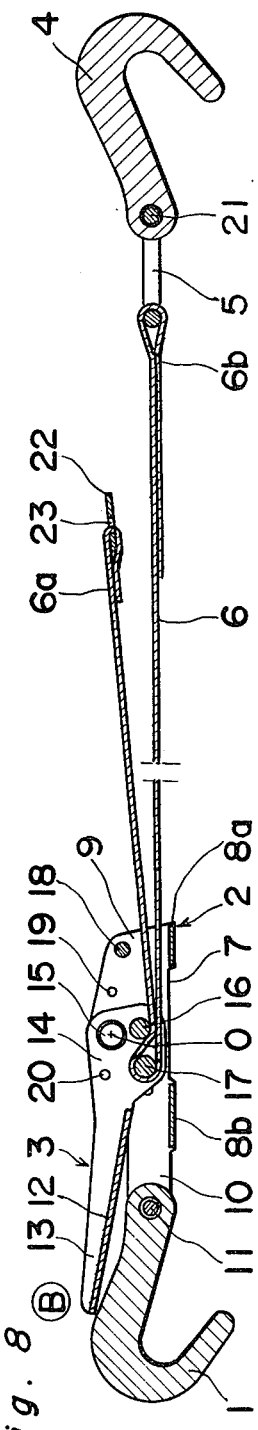

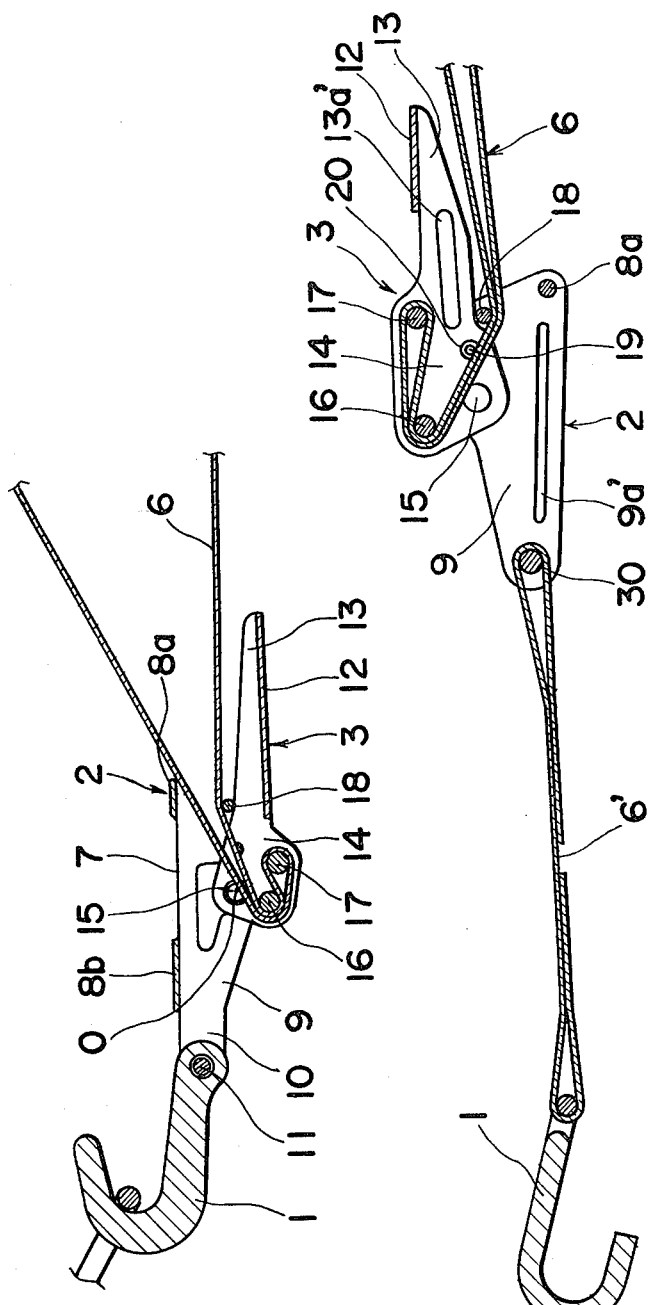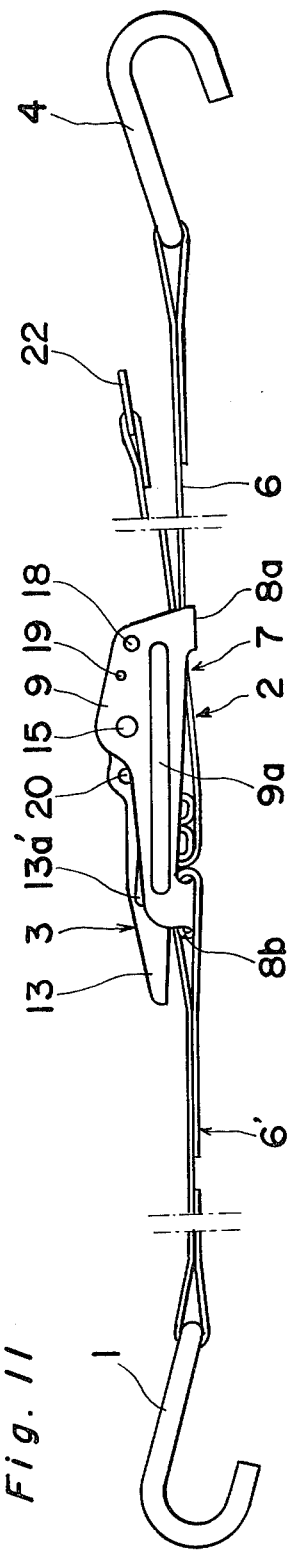
Fig. 9
Fig. 10
Fig. 11

CLASPING DEVICE

The present invention relates to a releaseable clasping device for clasping or fastening a flexible strap to hold an object firmly in position.

Such type of clasping devices are now produced on a large scale. The present problems to be solved are miniaturization of the clasping device and reduction of the cost of production.

Recently some types of clasping devices which meet such requirements have been provided. However, such conventional clasping devices can be further improved in such aspects as strength, reliability in operation and easiness in handling.

According to the Japanese Utility Model Publication No. 129694/1978 which was laid open to public inspection in 1978, there is disclosed a miniaturized releaseable clasping device and having a simple construction. However, this clasping device has disadvantages that the manipulatable lever means may happen to automatically turn towards the unlocked position relative to a body or holder pivotally connected to the manipulatable lever means when the strap connected to the manipulatable lever means oscillates up and down during use, that the construction is not sufficiently strong for a big load and that the shape of the assembly of the manipulatable means and the body in the unlocked position is so complicated to handle.

Accordingly, an essential object of the present invention is to provide a clasping device which can not only be produced in a compact size at lower cost, but also has higher reliability in that the manipulatable lever means can be always firmly held in the locked position during use even when the strap connected to the manipulatable lever means is given any oscillation or even when the assembly of the manipulatable lever means and the body turns upside down during the use.

Another object of the present invention is to provide a clasping device which is easy in handling and so firm as to be resistant against any big loads such as automobiles.

According to a preferred embodiment of the present invention, the clasping device comprises a body connected to a first hook, a manipulatable lever means pivotally connected to said body and a flexible strap connected to said manipulatable lever means and having a second hook connected thereto, said strap being selectively fastened and released by turning said manipulatable lever means towards a locked position or an unlocked position relative to said body, respectively, wherein said body comprises a pair of side plate members connected to each other in spaced relation and at least two connecting members respectively positioned at one end portion of said side plates near the second hook to form in cooperation with each other a clearance for the strap to pass therethrough and one connecting member at a relatively lower position being able to contact the strap to hold the manipulatable lever means in the locked position when the assembly of the body and the manipulatable lever means in the locked position is turned upside down, while the other connecting member at a relatively higher position being able to engage the manipulatable lever means to define its locked position and able to contact the strap when the manipulatable means is locked, and said manipulatable lever means comprises a pair of lever members connected to each other in a spaced relationship and having one end inserted in the space between said side plate members of the body and pivotally connected to the respective corresponding side plates by means of respective pins and a strap connecting member and a strap pressing member, a large part of the manipulatable lever means being housed in the body substantially in parallel to the body.

In any event, these and other objects and features of the present invention will become apparent from the following description of preferred embodiments thereof with reference to the accompanying drawings, in which:

FIG. 1 is a top plan view of a clasping device according to one preferred embodiment of the present invention, which is illustrated in a locked position;

FIG. 2 is a side elevational view of the clasping device shown in FIG. 1;

FIG. 3 is a side sectional view of the clasping device taken along the line III—III of FIG. 1;

FIG. 4 is a bottom plan view of the clasping device shown in FIG. 1;

FIGS. 5 and 6 are cross-sectional views taken along the lines V—V and VI—VI in FIG. 2, respectively;

FIGS. 7 and 8 are views similar to FIGS. 1 and 3, respectively, showing the clasping device in an unlocked position;

FIG. 9 is a view similar to FIG. 3, the clasping device being shown upside down with respect to the position shown in FIG. 3;

FIG. 10 is a view similar to FIG. 3 showing a clasping device according to another preferred embodiment of the present invention;

FIGS. 11 and 12 are views similar to FIGS. 7 and 3, respectively, showing a clasping device according to a further preferred embodiment of the present invention;

Before the description of the present invention proceeds, it is to be noted that like reference numerals are employed to designate like parts throughout the accompanying drawings.

Figure 12:
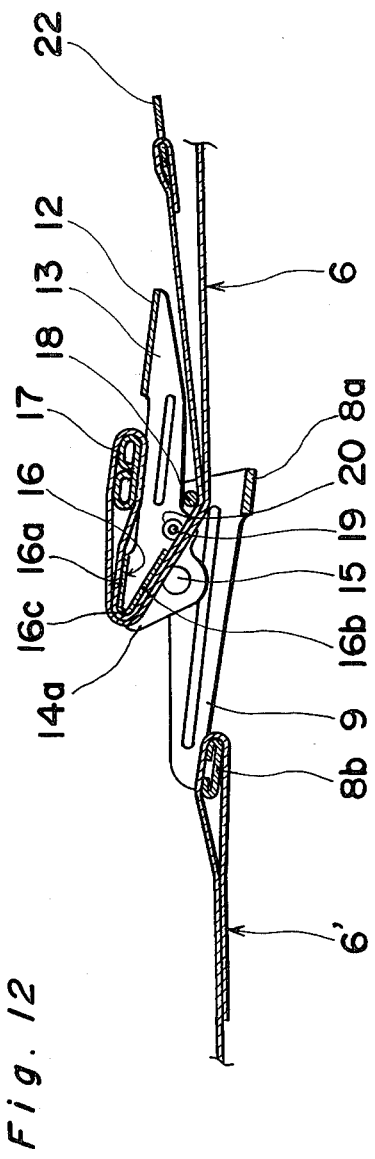

With reference to FIGS. 1 to 6, a clasping device according to the present invention comprises a body 2, a manipulatable lever means 3 having one end pivotally connected to said body 2 and a flexible strap 6 operatively passed through said lever means 3.

The body 2 is constituted by a pair of side plate members 9 connected in spaced relation to each other by means of connecting members comprising a pair of bottom bridge plates 8a and 8b integral therewith and a guide pin 18 positioned above one bottom bridge plate 18a. An opening 7 is formed between the pair of bottom bridge plates 8a and 8b. The pair of side plates 9 have adjacent ends 10 to which a first hook 1 is pivotally connected by means of a pin 11 with one end of the hook 1 sandwiched therebetween. One bridge plate 8a positioned on the right-hand side of the opening 7 in FIG. 3 defines in cooperation with said guide pin 18 a clearance C through which a length of strap 6 extends.

The manipulatable lever means 3 is constituted by an elongated bridge plate 12 which has the opposite side edges connected integrally to respective levers 13 of the same shape. Each of the levers 13 has a enlarged end portion 14 protruding beyond the bridge plate 12. This manipulatable lever means 3 is mounted on the body 2 with the enlarged end portions 14 of the respective levers 13 accommodated in the space between the side plates 9, and connected pivotally to the associated side plates 9 by means of corresponding pins 15. The manipulatable lever means 3 is manually pivotable through about 180° about the longitudinal axes of the pins 15 between a locked position A, as shown in FIG. 2, and an unlocked position B, as shown in FIG. 7 relative to the body 2. In order to prevent the inner end of each of the pins 15 from engaging with the opposite side edges of the strap 6, portions of the respective enlarged end portions 14 are outwardly recessed at 13a in the opposite directions relative to each other to receive heads of the corresponding pins 15 and, correspondingly, portions of the side plates 9, which are aligned with said recessed portions 13a in the enlarged end portions 14, are outwardly enlarged at 9a for receiving said enlarged end portions 14. The portions 9a in the side plates 9 can serve to compensate for any possible reduction in strength of the body 2 which would result from the provision of the opening 7 in the body 2. This manipulatable lever means has a strap connecting member comprising a cross pin 17 and a strap pressing member comprising a cross pin 16, respectively, said cross pins 16 and 17 extending in parallel to each other between the levers 13. The opposite ends of each of the cross pins 16 and 17 are secured to the respective enlarged end portions 14 at a position above the pin 15 and are so spaced a distance inwardly from the perimeters of the enlarged end portions 14 to form a guide portion around the cross pins 16 and 17 that the strap 6 turned around the cross pins 16 and 17 can be prevented from getting over the peripheral edge of the enlarged end portions 14. Preferably, both of the cross pins 16 and 17 are made of a stainless material such as stainless steel of plastic so as to avoid any possible rusting of the cross pins 16 and 17 which would adversely affect a smooth movement of the strap around these pins 16 and 17. And preferably, the cross pin 16 has a peripheral surface roughened or knurled or otherwise provided with a pattern of indentations, thereby avoiding any possible frictional slip between the cross pin 16 and the strap 6 after the manipulatable lever means 3 has been pivoted to the locked position A as shown in FIG. 3.

In order to avoid any possible accidental release of the manipulatable lever means 3 from the locked position, the clasping device of the present invention has means for holding the manipulatable lever means 3 in the locked position A. In the embodiment illustrated, the means for holding the manipulatable lever means 3 is shown to comprise a pair of opposed projections 19 formed on the respective side plates 9 of the body 2 and protruding therefrom in the opposite directions close to each other. Detent holes 20 cooperative with said projections 19 are defined at the corresponding points in the respective enlarged end portions 14 of the levers 9. It will readily be seen that, when the manipulatable lever means 3 is pivoted to the locked position, the projections 19 click into the corresponding detent holes 20, thereby holding the manipulatable lever means 3 firmly in the locked position A.

A length of the strap 6 extends from its free end 6a towards second hook 4, after first passing through the clearance C between the guide pin 18 and the bottom bridge plate 8, then turning around the cross pin 17 after having been deflected by the cross pin 16 and, after having again been deflected by the cross pin 16, emerging finally outwards through said clearance C. The free end 6a of the strap 6 has pivotally or loosely connected thereto a substantially rectangular eyelet 22. The other end 6b of the strap 6 is connected to a substantially triangular connecting member 5, the connecting member 5 is in turn connected to the second hook 4 by means of a pin 21 with one end of the hook 4 sandwiched between the opposite ends of the connecting member 5.

The operation of the clasping device of the present invention will now be described with reference to FIGS. 3, 8 and 9.

Assuming that the manipulatable lever means 3 is held in the unlocked position B as shown in FIGS. 7 and 8 and that the first and second hooks 1 and 4 are respectively engaged with chains or straps for fastening an object to hold it in a position, the first procedure is to pull the free end 6a of the strap 6 with the eyelet 22 in an opposite direction away from the body of the clasping device to hold bring the strap 6 under tension. Subsequently, the manipulatable lever means 3 in the unlocked position is turned about the pins 15 from the unlocked position B as shown in FIGS. 7 and 8 towards the locked position A as shown in FIGS. 2 and 3. As the manipulatable lever means 3 is so pivoted, the second hook 4 is drawn toward to the body 2.

When the manipulatable lever means 3 has been positioned at the locked position as shown in FIG. 3, the pins 11 and 21 align with the straightened portion of the strap 6 extending between the end 6b and the point in contact with the guide pin 18 as the strap is pulled under tension. The cross pins 16 and 17 turn around the pins 15 from a lower position as shown in FIG. 8 towards an upper position as shown in FIG. 3 during the movement of means 3 towards the locked position with the cross pin 17 pressing the overlapping portions of the strap 6 in contact with the cross pin 16.

When the manipulatable lever means 3 is pivoted, a portion of the strap 6, which moves together with the pins 16 and 17 is guided by the guide portion 14a of the respective enlarged end portions 14 of the levers 9 so as to remain within the space between the portions 14 whereby the strap 6 can be prevented from riding over the edge of the respective enlarged end portions 14.

Even when the clasping device is subjected to any vibration during the use and the portion of the strap 6 between the end 6b and the point in contact with the guide pin 18 is cyclicly pulled and loosened, any possible frictional slip between the roughened cross pin 16 and that portion of the strap 6 deflected in contact with said cross pin 16 is avoided, whereby the strap 6 can be held taut. In the locked position A, the pair of levers 13 are engaged with the guide pin 18, and the portion of the strap 6 between the cross pin 16 and said guide pin 18 is positioned above the longitudinal axes O of the pair of pins 15, whereby the tension given to the strap 6 urges the manipulatable lever means to rotate towards the locked position A. Therefore, even when the portion of the strap 6 between the end 6b and the guide pin 18 oscillates up and down during the use, any possible pivotal movement of the manipulatable lever means 3 back towards the unlocked position B can be avoided. The pair of projection 19 in the body 2 are respectively engaged in the corresponding detent holes 20 in the manipulatable lever means 3, thereby holding the manipulatable lever means 3 firmly in the locked position A.

It is to be noted that, even when the strap is loosened and, as a result thereof, the clasping device turns upside down during the use as shown in FIG. 9, the manipulatable lever means 3 will be held at the locked position A. As shown in FIG. 9, even when the corresponding portion of the strap 6 separates from the guide pin 18, it comes into contact with the edge of the bridge plate 8a, so that the portion of the strap 6 between the end 6a and the cross pin 16 will be held at the locked position wherein said portion of the strap 6 is placed on the side of cross pins relative to the axes O of the pair of pins 15.

It is also to be noted that, when the clasping device according to the present invention is released as shown in FIGS. 7 and 8, a large part of the manipulatable lever means 3 will be housed in the pair of side plates of the body 2 substantially in parallel to the bridge plates 8a and 8b and, for this purpose, the assembly of the manipulatable lever means 3 and the body 2 is formed in a substantially plan and compact construction. Therefore, the handling during assembly is easy and the gripping so firm as to be resistant against any big loads such as automobiles.

Figure 14:
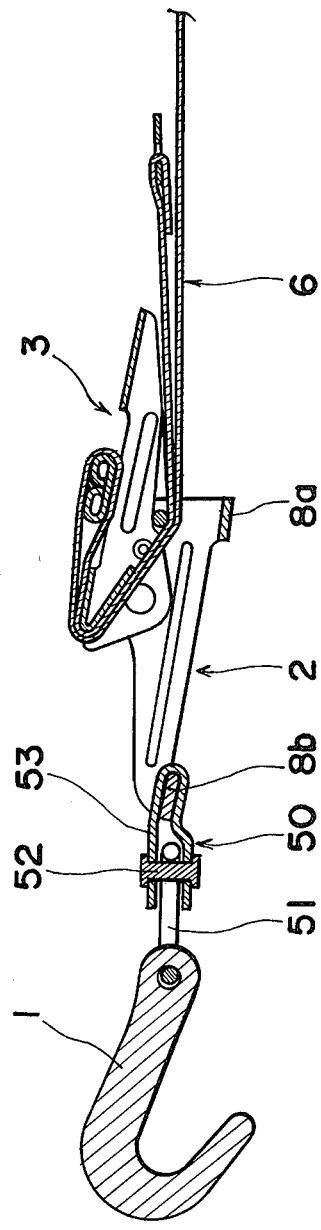
FIGS. 14 and 15 are views similar to FIG. 12 respectively showing clasping devices according to a further embodiments of the present invention.

Alternatively, said first hook 1 may be connected to the body 2 by means of a second flexible strap 6', as shown in FIG. 10. One end of the second strap 6' is connected to a cross pin 30 extending between the respective ends of the pair of side plates 9 of the body 2, while the other end of the strap 6' is connected to the first hook 1. Also, the first hook 1 may be connected to the body 2 by means of connecting metal members 50 as shown in FIG. 14, comprising a substantially U-shaped connecting member 55, which is connected to the bridge plate 8b extending between the respective ends of the pair of side plates 9 of the body 2, a link 51 connected to said first hook 1 and a pin 52 for connecting the connecting member 55 and link 51. Therefore, the first hook 1 can pivot not only vertically relative to the link 51 but also horizontally about the pin 52.

According to the present invention, the bridge plate 8a mentioned above, as a connecting member for connecting the pair of side plates 9 of the body 2 to each other, may be replaced by a cross pin 8a as shown in FIG. 10. In the embodiment shown in FIG. 10, the respective side plates 9 of the body 2 have outwardly recessed portions 9a' extending in the longitudinal direction of the side plate 9 between the cross pins 30 and 8a, which portions 9a' serve to reinforce the respective side plates 9 in a manner similar to the effect given by the enlarged portion 9a shown in FIGS. 1 to 9. The respective levers 13 of the manipulatable lever means 3 also have inwardly recessed portions 13a' extending in the longitudinal direction of the lever 13 for reinforcement. When the manipulatable lever means 3 is turned relative to the body 2, the recessed portions 13a' will not engage the respective inner surface of the side plates 9 since the portions 13a' are respectively recessed inwardly as described above.

Figure 13:
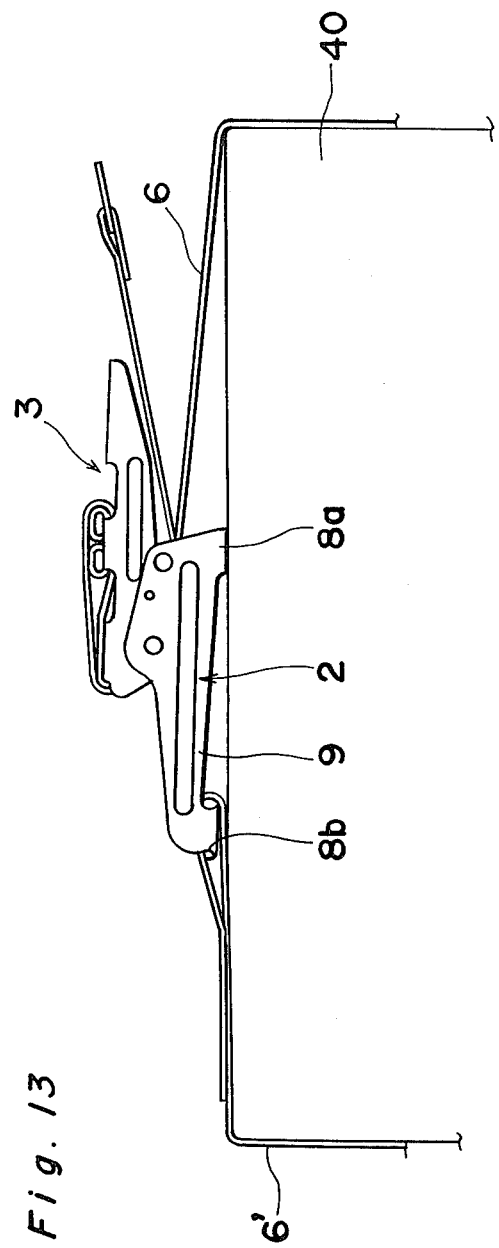
FIG. 13 is a side elevational view illlustrating a clasping device of FIG. 11 used for fastening a strap around a package.

Other preferred embodiment according to the present invention are shown in FIGS. 11 to 13. This embodiment has a feature in that the strap connecting member 17 and strap pressing member 16 are respectively formed by a pair of bridge plates 17 and 16 extending between the levers 13. The pair of bridge plates 17 and 16 are formed integrally with the levers 13 by pressing. The opposite side edge portions of the one bridge plate 17 are respectively bent outwards and curled to have a substantial B-shaped section so that the strap 6 can slide smoothly in contact with the bridge plate 17. One side edge portion 16b of the other bridge plate 16 remote from the bridge plate 17 is bent inwardly of the lever means 3 at an acute angle in a substantially V-shaped section. Preferably the surface of the bent portion 16c is roughened or knurled in order to avoid any possible frictional slip between the bridge plate 16 and the strap 6. The respective ends of the levers 13 remote from the bridge plate 12 protrude forwards beyond the bent portion 16c of the bridge plate 16 to form a guide portion 14a for the strap 6. The body 2 has a C-shaped bridge plate 8b for connecting the second strap 6', the bridge plate 8b is formed integrally with the side plates 9 by pressing.

In the above described embodiment, there are such specific advantages that both of the respective manipulatable lever means 3 and body 2 can be manufactured easily and at lower cost than heretofore since the numbers of pins to be welded to the levers 13 and side plates 9 are reduced and that, when the clasping device is employed for fastening a strap wound around a package 40, the respective bridge plates 8a and 8b can rest firmly on the surface of the package 40 as the bottom surfaces of the pair of bridge plates 8a and 8b are planar and, therefore, the manipulatable lever means 3 can be easily and smoothly operated.

Figure 15:
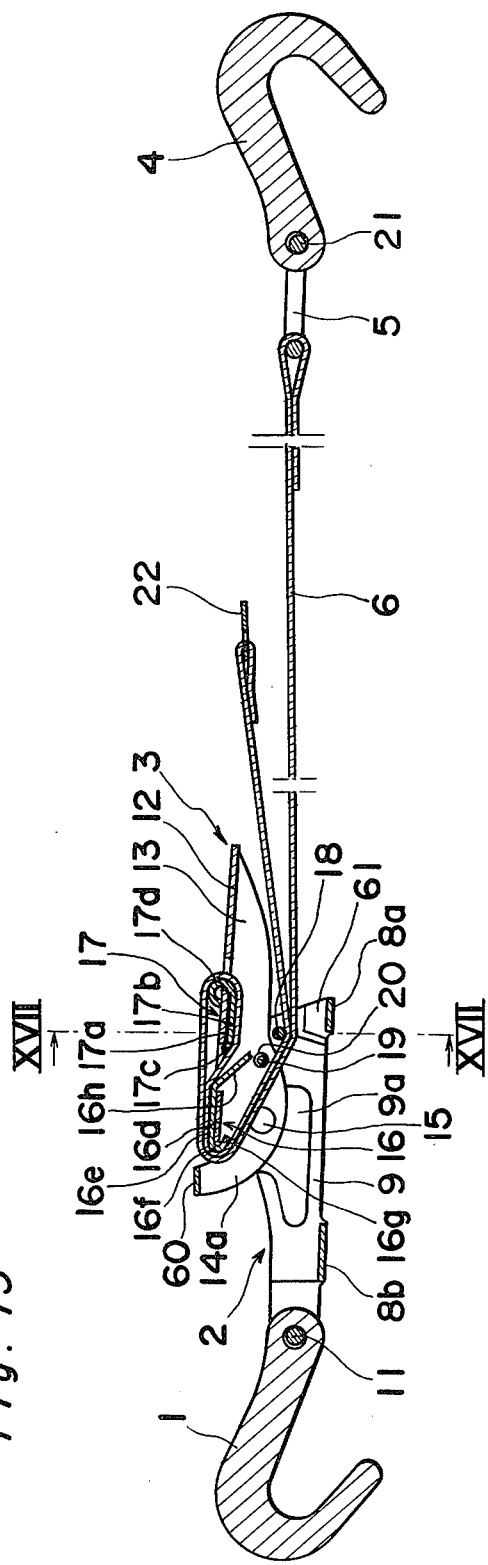
Figure 16:
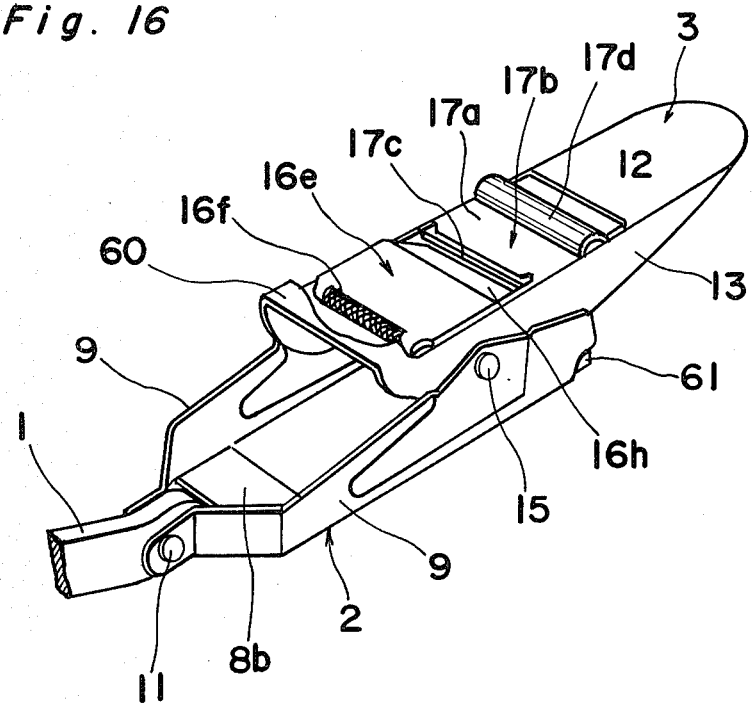
FIG. 16 is a perspective view of an essential portion of the clasping device shown in FIG. 15.
Figure 17:
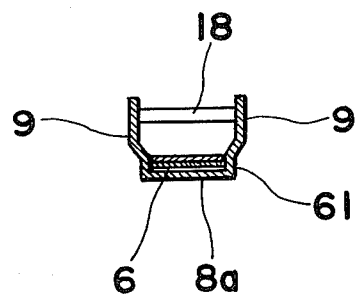
FIG. 17 is a cross-sectional view of the clasping device taken along the line XVII—XVII of FIG. 15.

The strap connecting member 16 and the strap pressing member 17 respectively shown in FIGS. 11 to 14 may be replaced by respective members 16 and 17 shown in FIGS. 15 to 17. With reference to FIGS. 15 to 17, the strap connecting member 16 comprises a planar bridge plate 16d for connecting the levers 13 to each other and a cover plate 16e rigidly applied on the outer surface of the bridge plate 16d. One edge portion 16g of the cover plate 16e remote from the bridge plate 12 is inwardly bent at an acute angle to form a substantially V-shaped section, the outer surface of the bent corner 16f being roughened or knurled, shown best in FIG. 16, for avoiding any possible slip between the cover plate 16e and the strap 6. The other edge portion 16h of the bridge plate 16e is also inwardly bent at an obtuse angle. On the other hand, the strap pressing member 17 comprises a planar bridge plate 17a for connecting the levers 13 to each other and a cover plate 17b rigidly applied on the inner surface of the bridge plate 17a. One edge portion 17c of the cover plate 17b remote from the bridge plate 12 is outwardly bent at an obtuse angle. The other edge portion 17d of the bridge plate 17b is also outwardly bent into a C-shape. The planar portion between the bent opposite edge portions 16g and 16h of the cover plate 16 and the C-shaped edge portion 17d of the other cover plate 17 respectively has the same width as that between the outer surfaces of a pair of levers 13. In other words they have a greater width than that of the strap 6, whereby the outer portion of the overlapped straps 6 between the bent corner 16f of one cover plate 16e and the C-shaped end portion 17d is always kept in a plane. Consequently, the strap 6 can smoothly slide in contact with the cover plates 16e and 17b.

In this embodiment there is provided a further bridge plate 60 extending between the guide portions 14a of the levers 13. Therefore, compared with other embodiments mentioned above, the strap 6 in this embodiment is further surely prevented from riding over the edges of the levers 13 when the manipulatable means is at the unlocked position B or turns from the unlocked position B towards the locked position A. Further the respective side plates 9 are inwardly recessed at 61 in the opposite directions relative to each other, the space between the inner surfaces of the recessed portions 61 being substantially the same width as the space between the inner surfaces of the levers 13, whereby the portion of the strap 6 on the bridge plate 8a can be placed at the right position.

Figure 18:
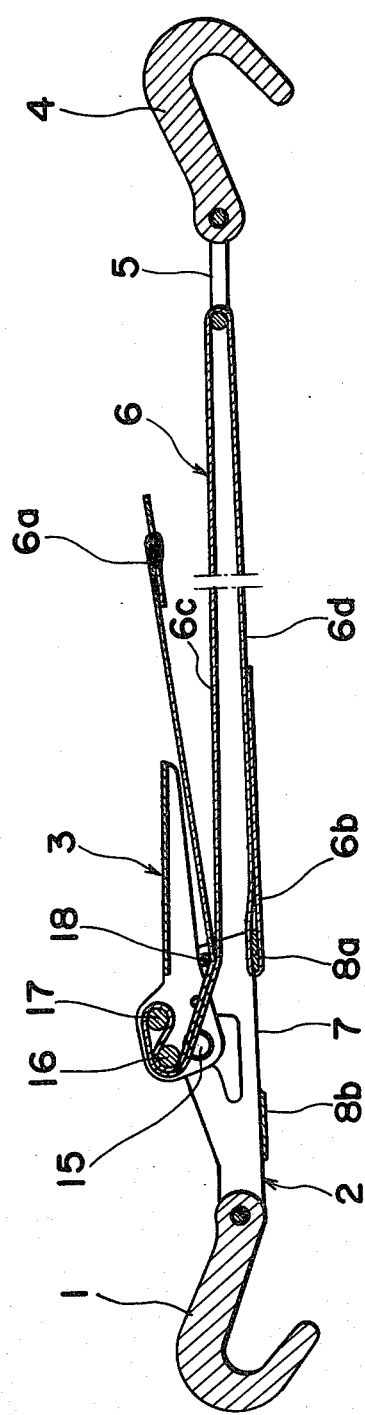
FIG. 18 is a view similar to FIG. 3 showing the clasping device according to a still further embodiment of the present invention.

FIG. 18 illustrates a modified form of the clasping device shown in FIGS. 1 to 9. As shown in FIG. 18, the end 6b of the flexible strap 6 is connected to the bridge plate 8a after having been loosely passed through an aperture in the connecting member 5, such that a portion of the strap 6 between the body 2 and the connecting member 5 is doubled as shown by 6c and 6d. The arrangement of the flexible strap 6 shown in FIG. 18 is advantageous in that, for a given pulling force acting to pull the hooks 1 and 4 in the opposite directions away from each other, the strap 6 in the arrangement of FIG. 18 has a physical strength twice that in the arrangement of FIGS. 1 to 9. In addition, assuming that the flexible strap generally has a nature tending to elongate to a certain extent as the pulling force acts thereon, the extent to which the portion of the strap 6 between the body 2 and the connecting member 5 elongates is smaller in the arrangement of FIG. 18 than that of FIGS. 1 to 9. This is because each of the strap portions 6c and 6d takes up half the load which the portion of the strap 6 between the body 2 and the connecting member 5 in the device of FIGS. 1 to 9 does.

Although the present invention has fully been described in conjunction with the preferred embodiments thereof with reference to the accompanying drawings, it is to be noted that various changes and modifications are apparent to those skilled in the art. Therefore, such changes and modifications are, unless they depart from the true scope of the present invention, are to be understood as being included within the scope of the present invention.

What is claimed is:

1. A clasping device comprising:
    a body having a pair of side plate members in side by side spaced relation and two connecting members extending between said plate members and connecting said plate members;
    a first hook connected to a first end of said body, said connecting members extending between said plate members at a second end of said body remote from said first member, said connecting members being spaced for defining a clearance therebetween;
    a manipulatable lever means pivotally connected to said body for movement between a locked position and an unlocked position, said lever means having a pair of lever members connected to each other in spaced relation and each having an end inserted in the space between said side plate members of the body, a strap connecting member and a strap pressing member extending between said lever members, the lever members being pivotally connected to corresponding side plate members at a point offset from said strap pressing member; and
    a flexible strap having a second hook connected thereto, said strap being connected around strap connecting member and having parallel portions extending around said strap pressing member and between the strap pressing member and the axis of the pivotal connections of the lever members to the side plate members and between said connecting members, said strap pressing member, when said lever means is in the locked position, pressing said strap for securing said strap in said clasping device and, when said lever means is in the unlocked position, releasing said strap for permitting movement of said strap around said strap connecting member, said connecting members being positioned on said body with one connecting member more remote from said strap connecting and strap pressing members for, when said body is in a normal upright position, causing said strap portions extending between said connecting members to engage only the connecting member which is closer to said strap connecting and strap pressing members and, when said body is in an upside down position, to cause said strap portions to engage only the connecting member which is more remote from said strap connecting and strap pressing members, and the path of said strap portions in both positions being kept between said strap pressing member and said axis of the pivotal connections for exerting a turning force on said lever means tending to pivot said lever means to the locked position.

2. A clasping device as claimed in claim 1, wherein said ends of the lever members have respective guide portions formed around the strap pressing member for preventing the strap passing around the pressing member from getting over the peripheral edge of the respective lever members.

3. A clasping device as claimed in claim 1, wherein said strap connecting member and the strap pressing member are respectively made of stainless material.

4. A clasping device as claimed in claim 1, wherein said strap pressing member has a roughened surface for avoiding any frictional slip between the strap pressing member and the strap.

5. A clasping device as claimed in claim 1, further comprising a pin pivotally connecting said first hook to said side plate members of the body.

6. A clasping device as claimed in claim 1, further comprising a second flexible strap connecting the first hook to said side plate members of the body.

7. A clasping device as claimed in claim 1, further comprising connecting metal members connecting the first hook to said side plate members of the body.

8. A clasping device as claimed in claim 1, wherein at least one of said connecting members between said side plate members of the body is a bridge plate integral with said side plate members.

9. A clasping device as claimed in claim 1, wherein said strap connecting member and the strap pressing member are cross pins extending between said lever members.

10. A clasping device as claimed in claim 1, wherein said strap connecting member and strap pressing member are each a bridge plate integral with said lever members, the opposite side edge portions of the bridge plate which is the strap connecting member being respectively bent outwards and curled to form a substantial B-shape in cross-section, and one side edge portion of the other bridge plate which is the strap pressing member and which edge is near said guide portion of the levers being bent inwardly at an acute angle to form a substantially V-shaped cross-section.

11. A clasping device as claimed in claim 10, further comprising a further bridge plate connecting said guide portions of the lever members and integral with the lever members.

12. A clasping device as claimed in claim 1, wherein said strap connecting member and strap pressing member are each a bridge plate integral with said lever members, the first bridge plate constituting the strap connecting member having a first cover plate rigidly secured on the inner surface thereof, one edge portion of the first cover plate toward the other bridge plate being outwardly bent at an obtuse angle, the opposite edge portion of the first cover plate being outwardly bent into C-shape, the second bridge plate constituting said strap pressing member having a second cover plate rigidly secured on the outer surface thereof, one edge portion of the second cover plate toward said guide portions of the lever members being inwardly bent at an acute angle, and the opposite edge portion being inwardly bent at an obtuse angle.

13. A clasping device as claimed in claim 1, wherein one end portions of the side plates of the body near the second hook have inwardly recessed portions, the space between the inner surfaces of the recessed portions having substantially the same width as the space between the inner surfaces of the lever members.

14. A clasping device as claimed in claim 1, further comprising a coupling member connected to the second hook and having an aperture therein, said strap having one end portion connected to the connecting member at the lower position after having been loosely passed through the aperture in said coupling member.

* * * * *